Feb. 3, 1942.   C. L. THOMAS   2,271,670
CATALYTIC CRACKING OF HYDROCARBON OIL
Filed Jan. 22, 1940
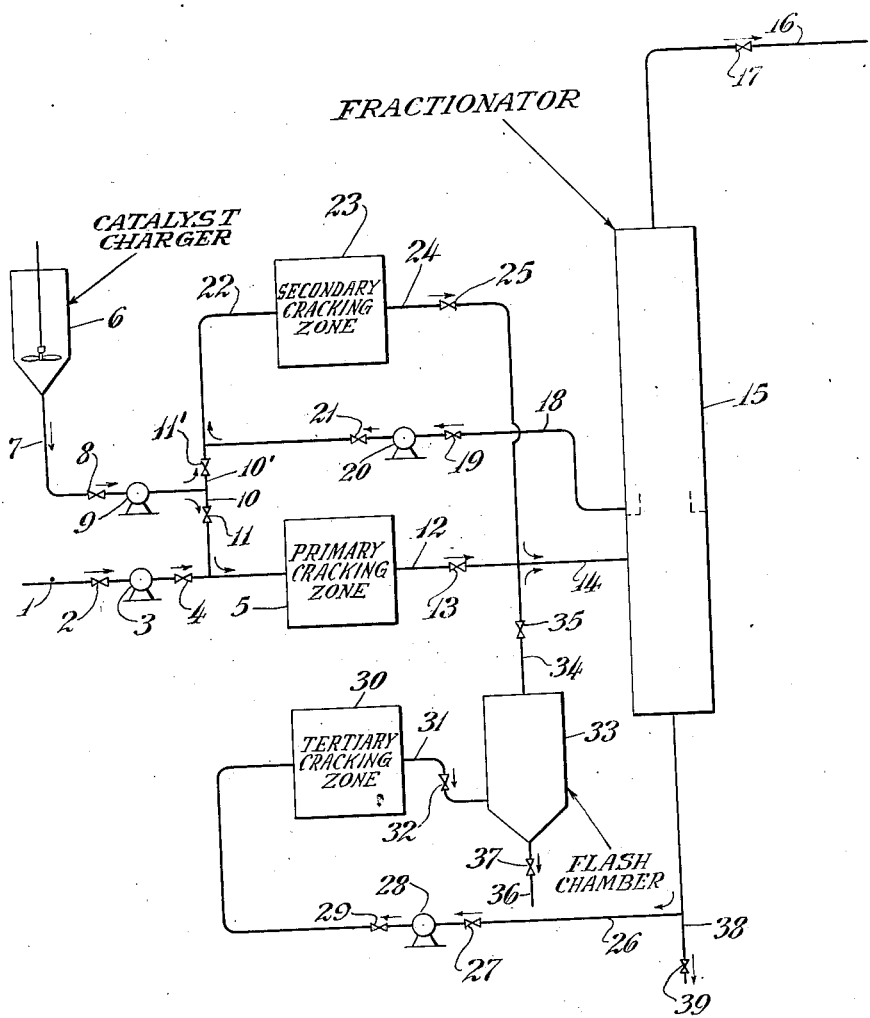

Patented Feb. 3, 1942

2,271,670

UNITED STATES PATENT OFFICE 2,271,670

CATALYTIC CRACKING OF HYDROCARBON OIL

Charles L. Thomas, Chicago, Ill., assignor to Universal Oil Products Company, Chicago, Ill., a corporation of Delaware Application January 22, 1940, Serial No. 314,947

5 Claims. (Cl. 196—49)

This invention which is a continuation-in-part of my co-pending application Serial No. 291,893, filed August 25, 1939, relates to a process for converting hydrocarbon oils into valuable products including high antiknock gasoline by treatment of said hydrocarbon oil with a powdered catalytic agent under suitable conditions of temperature and pressure, and in a series of cooperating steps to bring about catalytic cracking thereof.

The use of catalytic agents to assist the thermal decomposition of hydrocarbon oils such as those of petroleum origin into high yields of gasoline and other valuable products has been practiced. Among the agents employed are the reduced metal catalysts including iron, cobalt, nickel, etc., which are subject to a number of disadvantages including the fact that they are poisoned by sulfur compounds which may be present in oils undergoing conversion, and furthermore that they tend to promote gas and carbon-forming reactions with the net result that the catalyst life is comparatively short. Another type of cracking catalyst is the activated earth type in which naturally occurring clays are used which have been treated with acids or other chemicals to increase their catalytic activity.

Still another type of catalyst is made up of activated alumina or magnesia which may have deposited thereon various promoting oxides of elements selected from the left-hand column of the 4th, 5th and 6th groups of the periodic table and include particularly such oxides as those of chromium, molybdenum, vanadium, etc.

A further type of catalyst, which is the preferred material of this invention is the so-called silica-alumina, silica-zirconia and silica-alumina-zirconia composite which is manufactured by the separate or simultaneous precipitation of the component compounds followed by washing, drying and calcining steps whereby a finished catalyst is prepared. The catalysts are prepared under such conditions that alkali-metal ions are substantially eliminated in order to obtain adequate catalytic activity and stability insofar as a satisfactory catalyst life is concerned.

In one specific embodiment the present invention comprises a process for converting hydrocarbon oil into valuable products including high antiknock motor fuel which comprises subjecting said hydrocarbon oil in the presence of a powdered cracking catalyst to conditions of temperature and pressure adequate to effect substantial cracking thereof in a primary cracking zone, supplying the reaction products to a fractionation step, recovering gasoline and gas therefrom, subjecting an intermediate boiling side cut in the presence of a separate portion of fresh powdered cracking catalyst to catalytic cracking conditions of temperature and pressure in a secondary cracking zone and supplying the reaction products therefrom to said fractionation step, subjecting the fractionator bottoms containing partially spent catalyst suspended therein to catalytic cracking conditions of temperature and pressure in a tertiary cracking zone, supplying the vaporous portion of said reaction products to said fractionation step and withdrawing a residual portion of said reaction products containing substantially spent catalyst suspended therein.

The process is illustrated in diagrammatic form in the attached drawing, which has not been made to scale nor has any attempt been made to proportionate the equipment. The process should not be interpreted as being limited to the exact conditions shown therein.

Hydrocarbon oil is introduced through line 1, valve 2, pump 3, valve 4 to primary cracking zone 5. The hydrocarbon oil may comprise any suitable hydrocarbon or fraction of hydrocarbon oil such as distillate fractions of crude petroleum, topped crude oil, crude oil, etc. Hydrocarbon oils of similar character from other sources may also be converted. Powdered cracking catalyst such as silica-alumina, silica-zirconia, silica-alumina-zirconia, acid-treated clay, or catalytic composites composed of alumina, magnesia or other relatively inert supports having deposited thereon promoting oxides such as chromia, molybdena, etc., are introduced from catalyst charger 6 through line 7, valve 8, pump 9, line 10 and valve 11 to primary cracking zone 5. The catalysts mentioned are used in finely divided form which may be of colloidal dimensions or larger. Of the catalysts mentioned, the silica-alumina, etc., type is preferred, although the other types are useful but not necessarily equivalent in their effectiveness. Some are more useful under certain conditions than others, and it is within the scope of the invention to use the most suitable catalyst in the process for which it is best adapted.

The cracking zone may comprise any suitable type of catalytic cracking equipment adapted to the purpose in hand. The invention is not to be interpreted as limited to any exact type of apparatus. It normally comprises a tubular coil in a heated zone whereby the oil is brought to suitable conditions of temperature and pressure followed by any type of contactor or reactor which may be used with powdered catalysts. These include coils of pipe in a furnace or vertical reactors containing contacting members such as bubble trays, baffles, etc. The reaction products pass through line 12, valve 13 and line 14 to fractionator 15. Gasoline and gas are removed through line 16 and valve 17. An intermediate boiling side cut boiling above the gasoline range is removed through line 18, valve 19, pump 20, valve 21 and line 22 to secondary cracking zone 23 which may be similar to primary cracking zone 5. Fresh powdered catalyst is introduced through line 10' and valve 11'. The reaction products pass through line 24 and valve 25, which joins with line 14, and pass to fractionator 15. The fractionator bottoms containing partially spent catalyst from the primary and secondary cracking steps suspended therein are removed through line 26, valve 27, pump 28, valve 29 to tertiary cracking zone 30 which may be similar to the primary and secondary zones. The reaction products pass through line 31 and valve 32 to flash chamber 33. The pressure is usually reduced at this point and the vaporous portion passes through line 34 and valve 35 to line 14 and thence to fractionator 15. A residual portion containing spent catalyst in suspension is removed through line 36 and valve 37. It may be passed through a suitable recovery system whereby the powdered catalyst is recovered and the residual oil may be used as fuel or cracked in a thermal cracking unit or passed to coking chambers, etc. The catalyst is reactivated by burning the carbonaceous and hydrocarbonaceous materials from the surfaces by means of an oxygen-containing gas in a separate reactivation system. Line 38 and valve 39 serve as a means of draining fractionator 15 to remove a portion or all of the fractionator bottoms if desired. The process may also be operated with only the primary and secondary steps.

Various pumps, heaters, heat exchangers, condensers, stabilizers, etc., necessary to the operation of a process of this type have been omitted in the interests of simplifying the drawing.

The temperatures at which the cracking is carried out may be from approximately 500–1200° F. and the pressures from approximately 50–1000 pounds per square inch or higher. The temperature conditions may be suitably adjusted to obtain the optimum cracking conditions for each of the several zones described.

The following examples are given to illustrate the usefulness and practicability of the process, but should not be construed as limiting it to the exact conditions given therein.

*Example I*

A Mid-Continent gas oil may be mixed with powdered silica-alumina-zirconia cracking catalyst and subjected to a primary cracking step at 400 pounds per square inch pressure and 950° F., reaction products may be passed to a fractionator and gasoline and gas recovered. An intermediate boiling side cut may be removed, mixed with fresh cracking catalyst and passed to a secondary cracking step at a temperature of 975° F. and a pressure of 450 pounds per square inch, the reaction products being fractionated. The residual oil from the fractionator containing partially spent cracking catalyst suspended therein is passed to a tertiary cracking zone at a temperature of 930° F. and a pressure of 350 pounds per square inch. The reaction products may be passed to a flash chamber wherein the pressure is reduced to 50 pounds per square inch. A vaporous portion is returned to the fractionator and the residue containing catalyst in suspension is removed from the flash chamber. The spent catalyst is separately recovered and reactivated by means of an oxygen-containing gas. A total of 78% of 400° F. end point gasoline may be recovered, the octane number of the gasoline being 78. This yield also includes the portion obtainable by polymerization of the gaseous polymerizable olefins contained in the process gases.

*Example II*

A topped crude oil from a West Texas source mixed with a powdered cracking catalyst may be passed through a primary cracking step at 900° F. and 250 pounds per square inch pressure. Reaction products are passed through a primary cracking step at 900° F. and 250 pounds per square inch pressure. Reaction products are passed to a fractionator and the gasoline and gas recovered therefrom. An intermediate boiling side cut of gas oil boiling range may be mixed with fresh cracking catalyst and converted in a secondary cracking step at 975° F. and 400 pounds per square inch pressure. The reaction products are supplied to the fractionator from which a residue containing spent catalyst in suspension is continuously withdrawn. A yield of 48% of 400° F. end point cracked gasoline is obtainable in this manner, having an octane number of 78. The residue obtained may be used as a fuel oil after being freed of the powdered catalyst. The catalyst is reactivated by contact with an oxygen-containing gas.

I claim as my invention:

1. A hydrocarbon oil conversion process which comprises subjecting the oil to catalytic cracking conditions in admixture with powdered cracking catalyst, introducing the resultant products to a fractionating zone and therein separating a gasoline-containing overhead product, a residual fraction containing said catalyst, and a condensate fraction boiling intermediate said overhead product and residual fraction, commingling additional powdered cracking catalyst with said intermediate condensate fraction and subjecting the resultant mixture to independently controlled catalytic cracking conditions, introducing the products of the last-mentioned step to the fractionating zone for fractionation therein together with the first-mentioned products, removing the catalyst-containing residual fraction from the fractionating zone and subjecting the same to catalytic conversion independently of the first-named oil and said intermediate condensate fraction, separating the resultant products into vapors and residue, and supplying the separated vapors to the fractionating zone.

2. A hydrocarbon oil conversion process which comprises subjecting the oil to catalytic cracking conditions in admixture with powdered cracking catalyst, introducing the resultant products to a fractionating zone and therein separating a gasoline-containing overhead product, a residual fraction containing said catalyst, and a condensate fraction boiling intermediate said overhead product and residual fraction, commingling additional powdered cracking catalyst with said intermediate condensate fraction and subjecting the resultant mixture to independently controlled catalytic cracking conditions, introducing the products of the last-mentioned step to the fractionating zone for fractionation therein together with the first-mentioned products, removing the catalyst-containing residual fraction from the fractionating zone and subjecting the same to catalytic conversion independently of the first-named oil and said intermediate condensate fraction, reducing the pressure on the resultant products and separating the same into vapors and residue, and supplying the separated vapors to the fractionating zone.

3. The process as defined in claim 1 further characterized in that said catalytic conversion steps are effected at temperatures in the approximate range of 500–1200° F.

4. The process as defined in claim 1 further characterized in that said intermediate condensate fraction is cracked at higher temperature than said residual fraction.

5. The process as set forth in claim 1 wherein the cracking catalyst is selected from the group consisting of silica-alumina, silica-zirconia and silica-alumina-zirconia.

CHARLES L. THOMAS.